US012673379B2

(12) United States Patent
Mondal et al.

(10) Patent No.: US 12,673,379 B2
(45) Date of Patent: Jul. 7, 2026

(54) ACCELERATING THE THERMOPLASTICS WELDING PROCESS USING MULTI-SOURCE MACHINE LEARNING

(71) Applicant: Raytheon Technologies Corporation, Farmington, CT (US)

(72) Inventors: Sudeepta Mondal, Windham, CT (US); Soumalya Sarkar, Manchester, CT (US); John Joseph Gangloff, Middletown, CT (US); Wenping Zhao, Glastonbury, CT (US); Lei Xing, South Windsor, CT (US)

(73) Assignee: RTX Corporation, Farmington, CT (US)

( * ) Notice: Subject to any disclaimer, the term of this patent is extended or adjusted under 35 U.S.C. 154(b) by 861 days.

(21) Appl. No.: 18/089,911

(22) Filed: Dec. 28, 2022

(65) Prior Publication Data

US 2024/0217016 A1 Jul. 4, 2024

(51) Int. Cl.
B23K 9/095 (2006.01)
G05B 13/02 (2006.01)

(52) U.S. Cl.
CPC ........ B23K 9/0953 (2013.01); G05B 13/0265 (2013.01)

(58) Field of Classification Search
CPC .. B23K 9/0953; G05B 13/0265; G05B 13/02; B29C 65/3668; B29C 66/1122;
(Continued)

(56) References Cited

U.S. PATENT DOCUMENTS

2020/0257933 A1* 8/2020 Steingrimsson .......... B22F 5/04
2022/0108053 A1* 4/2022 Daware .................. G06T 17/20
2022/0198333 A1* 6/2022 Pack ..................... G06F 18/214

FOREIGN PATENT DOCUMENTS

CN 114872326 A 8/2022
EP 3967437 A1 3/2022
(Continued)

OTHER PUBLICATIONS

Sasso, Remo, Matthia Sabatelli, and Marco A. Wiering. "Multi-source transfer learning for deep model-based reinforcement learning." arXiv preprint arXiv:2205.14410 (2022). (Year: 2022).*
European Search Report for counterpart EP application No. 23206442 dated Apr. 22, 2024.

(Continued)

*Primary Examiner* — Chuen-Meei Gan
(74) *Attorney, Agent, or Firm* — Bachman & LaPointe, P.C.

(57) ABSTRACT

A system having a set of instructions executable by the system for multi-source machine learning modeling framework for process property mapping of thermoplastic composite manufacturing, the set of instructions comprising: an instruction to select a surrogate machine learning model from a suite of machine learning networks; an instruction to involve uncertainty quantification associated with predictions which provide a quantified estimate of how much the machine learning model can be trusted; an instruction to provide multi-physics process model output to the machine learning model; an instruction to provide heterogeneous data sources for use by the machine learning model; an instruction to determine estimates of optimal process parameters employing budget-constrained multi-fidelity process optimization; an instruction for deployment the multi-source machine learning model in the implementation of carbon fiber reinforced thermoplastic polymer induction welding;

(Continued)

10

Experiments
High-Fidelity Thermal model
Low-Fidelity Thermal model
High-Fidelity EM model

14

Multi-source multi-fidelity process models

16

ML surrogate model

Objectives/ Constraints
• Maximize heat-up rate
• Peak temperature and cool-down rate within prescribed limits
• Constraints on input space Iterative optimization schemes Budget-constrained adaptive sampling of next input queries Input space of process parameters
• Coil current
• Coil current frequency
• Coil-part gap distance
• Coil speed
• Thermal conductivity
• Heat transfer coefficient...

No Converged?

Yes

Optimality conditions

Optimal process parameters and an instruction to perform induction welding with an optimized recipe.

15 Claims, 5 Drawing Sheets

(58) Field of Classification Search
CPC ................ B29C 66/43; B29C 66/7212; B29C
66/73921; B29C 66/965; G06N 3/045;
G06N 5/01; G06N 7/01; G06N 20/00;
G06N 20/20
See application file for complete search history.

(56) References Cited

FOREIGN PATENT DOCUMENTS

| | | | |
|---|---|---|---|
| WO | 2019180142 | A1 | 9/2019 |
| WO | 2020077693 | A1 | 4/2020 |

OTHER PUBLICATIONS

Hürkamp André et al: "Integrated computational product and production engineering for multi-material lightweight structures", The International Journal of Advanced Manufacturing Technology, Springer, London, vol. 110, No. 9-10, Sep. 11, 2020, pp. 2551-2571, XP037251657.

Alexander Lavin et al: "Simulation Intelligence: Towards a New Generation of Scientific Methods", arxiv.org, Cornell University Library, 201 Olin Library Cornell University Ithaca, NY 14853, Dec. 6, 2021, XP091117010.

* cited by examiner

ACCELERATING THE THERMOPLASTICS WELDING PROCESS USING MULTI-SOURCE MACHINE LEARNING

This invention was made with Government support under Contract DE-EE0009398, awarded by the United States Department of Energy. The Government has certain rights in this invention.

BACKGROUND

The present disclosure is directed to the improved thermoplastic composite induction welding process, particularly the use of multi-source machine learning employed to enhance thermoplastic induction welding processes.

Carbon fiber reinforced thermoplastic (CFRTP) composites are used extensively in aerostructure manufacturing. High fidelity simulations for CFRTP induction welding is computationally expensive and performing experiments for a wide range of process parameters is infeasible. State of the art of CFRTP composite induction welding involves time-consuming development and optimization process, which hinders its efficiency and scalability. Thermoplastic composite (TPC) welding process development is empirical in nature and creates uncertainties in material properties both near field and far field from the induction coils. There is existing research work which has used machine learning (ML) to develop surrogate models for TPC-based manufacturing processes, the focus has been either simulation or experimental data sources for the machine learning model training, without any attempt of reducing the data requirement from the sources. Relying solely on either of these sources can be computationally very expensive for developing accurate ML surrogate models. This is because understanding of the induction heating processes for CFRTP involves running numerous high-fidelity and expensive multi-physics models such as electromagnetic models, thermal models, materials models, as well as performing various lab-scale and industrial scale experiments over wide range of process parameters. Hence the task of optimizing CFRTP welding process is challenging and resource intensive.

What is needed is a process to accelerate and enhance CFRTP welding using a machine learning (ML) framework for process parameter optimization.

SUMMARY

In accordance with the present disclosure, there is provided a processor system comprising a computer readable storage device readable by the system, tangibly embodying a program having a set of instructions executable by the system to perform the following steps for multi-source machine learning modeling framework for process property mapping of thermoplastic composite manufacturing, the set of instructions comprising: an instruction to select a surrogate machine learning model from a suite of machine learning frameworks; an instruction to involve uncertainty quantification associated with predictions which provide a quantified estimate of how much the multi-source machine learning model can be trusted; an instruction to provide multi-physics process model output to the machine learning model; an instruction to provide heterogeneous data sources for use by the machine learning model; an instruction to determine estimates of optimal process parameters employing budget-constrained multi-fidelity process optimization; an instruction for deployment of the multi-source machine learning model in the implementation of carbon fiber reinforced thermoplastic polymer induction welding; and an instruction to perform induction welding via machine learning informed process parameter recipes.

A further embodiment of any of the foregoing embodiments may additionally and/or alternatively include the system further comprising an instruction to leverage multi-source information to select an appropriate surrogate model from the suite of machine learning frameworks, the suite of machine learning frameworks including Gaussian processes, deep neural networks, and random forests.

A further embodiment of any of the foregoing embodiments may additionally and/or alternatively include the system further comprising an instruction to employ predictive posterior estimates with uncertainty quantification from the fast surrogates in offline process recipe development.

A further embodiment of any of the foregoing embodiments may additionally and/or alternatively include the system further comprising an instruction to select the multi-source machine learning modeling framework through cross-validation guided by error metrics until predetermined key performance indicators for the thermoplastic composite manufacturing process are met.

A further embodiment of any of the foregoing embodiments may additionally and/or alternatively include the system further comprising an instruction to demonstrate temperature requirements at each point along a welded joint of the thermoplastic composite manufacturing process.

A further embodiment of any of the foregoing embodiments may additionally and/or alternatively include the system further comprising an instruction to utilize temperature requirements in thermoplastic composite welded parts, such that a minimum time above a melting temperature can be obtained for each point within a welded joint, without exceeding a maximum allowable temperature for the material of the thermoplastic composite welded parts and obtaining a cooling rate after welding to allow for recrystallization of the material of the thermoplastic composite welded parts.

In accordance with the present disclosure, there is provided a welding processing system using a multi-source machine learning modeling framework for process-property mapping of thermoplastic composite manufacturing comprising a thermoplastic composite welding system configured to capture data for at least one of a temperature, coil current, compaction force and process time associated with induction welding thermoplastic composite welded part; and a processor coupled to the thermoplastic composite welding system, the processor configured to implement the welding recipes generated by the multi-source machine learning modeling framework.

A further embodiment of any of the foregoing embodiments may additionally and/or alternatively include the system for a multi-source machine learning modeling framework further comprising a tangible, non-transitory memory configured to communicate with the processor, the tangible, non-transitory memory having instructions stored therein that, in response to execution by the processor, cause the processor to perform operations comprising receiving, by the processor, the temperature requirements in the thermoplastic composite welded part; selecting, by the processor, a machine learning model; determining, by the processor, a quantified estimate of how much the machine learning model can be trusted by use of uncertainty quantification associated with predictions which provide the estimate; providing, by the processor, heterogeneous data sources for use by the machine learning model; providing, by the processor, multi-physics process output from the heterogeneous data sources to the machine learning model; deploying, by the processor, the multi-source machine learning model recipes for the implementation of carbon fiber reinforced thermoplastic polymer induction welding; determining, by the processor, estimates of optimal process parameters employing budget-constrained multi-fidelity process optimization; and providing, by the processor, an optimized recipe for performing induction welding.

A further embodiment of any of the foregoing embodiments may additionally and/or alternatively include the processor further comprises operations comprising leveraging multi-source information to select a surrogate model from the suite of machine learning frameworks, the suite of machine learning frameworks including Gaussian processes, deep neural networks, and random forests.

A further embodiment of any of the foregoing embodiments may additionally and/or alternatively include the processor further comprises operations comprising utilizing temperature requirements in thermoplastic composite welded part; obtaining a minimum time above a melting temperature for each point within a welded joint, in the absence of exceeding a maximum allowable temperature for the material of the thermoplastic composite welded part; and obtaining a cooling rate after welding to allow for recrystallization of the material of the thermoplastic composite welded part.

A further embodiment of any of the foregoing embodiments may additionally and/or alternatively include the processor further comprises operations comprising learning a degree of correlation present between multi-fidelity models and available experimental data, resulting in a multi-source machine learning model that is computationally efficient.

A further embodiment of any of the foregoing embodiments may additionally and/or alternatively include the processor further comprises operations comprising fusing heterogeneous data sources along with multi-physics models such as electromagnetic models, thermal models, materials models; performing at least one lab-scale experiment and at least one industrial scale experiment over a range of process parameters so that the machine learning modeling framework can benefit from all of them in the absence of requiring the generation of a data set of the induction heating processes for carbon fiber reinforced thermoplastic polymer induction welding.

A further embodiment of any of the foregoing embodiments may additionally and/or alternatively include the processor further comprises operations comprising optimizing the thermoplastic composite manufacturing process under design and budget constraints through an iterative multi-source rapid process optimization cycle.

A further embodiment of any of the foregoing embodiments may additionally and/or alternatively include the processor further comprises operations comprising providing a trained surrogate model from an initial set of multi-source observations; leveraging previous work on information-theoretic sampling for constrained Bayesian optimization to develop data acquisition strategies that can simultaneously account for (i) the mutual information across heterogeneous data sources, (ii) the expected information gain from acquiring a new sample at a given fidelity simulation or experiment, as well as (iii) the computational cost or operational time associated with evaluating each model or test runs in the multi-fidelity hierarchy of the problem.

A further embodiment of any of the foregoing embodiments may additionally and/or alternatively include the processor further comprises operations comprising iteratively finding optimal welding process parameters for achieving temperature requirements in weld parts within predefined computational budget limitations.

A further embodiment of any of the foregoing embodiments may additionally and/or alternatively include the processor further comprises operations comprising applying the multi-source machine learning modeling framework to predict scalar fields, such as a power density field in composite plies resulting from EM simulations, and a temperature field in the composite plies resulting from coupled electromagnetic heat transfer simulations.

A further embodiment of any of the foregoing embodiments may additionally and/or alternatively include the processor further comprises operations comprising utilizing suitable dimensional reduction techniques such as deep autoencoders; and reducing a dimension of data to a tractable number for heterogeneous information fusion.

A further embodiment of any of the foregoing embodiments may additionally and/or alternatively include the processor further comprises operations comprising predicting, by use of the multi-source machine learning modeling framework, power density and temperature fields in parts to be welded for an unknown process parameter combination.

The disclosure includes a multi-source machine learning (ML) modeling technique for advancing the manufacture and assembly of high performance, lightweight, thermoplastic composite (TPC), such as carbon fiber reinforced thermoplastic polymer (CFRTP) aerospace products. The disclosure includes an efficient methodology of fusing heterogeneous data sources (multi-fidelity process models, experiments, etc.) so that an ML framework can benefit from all of them, without requiring the generation of a prohibitively large data set.

Other details of the process are set forth in the following detailed description and the accompanying drawings wherein like reference numerals depict like elements.

DETAILED DESCRIPTION

Figure 1:
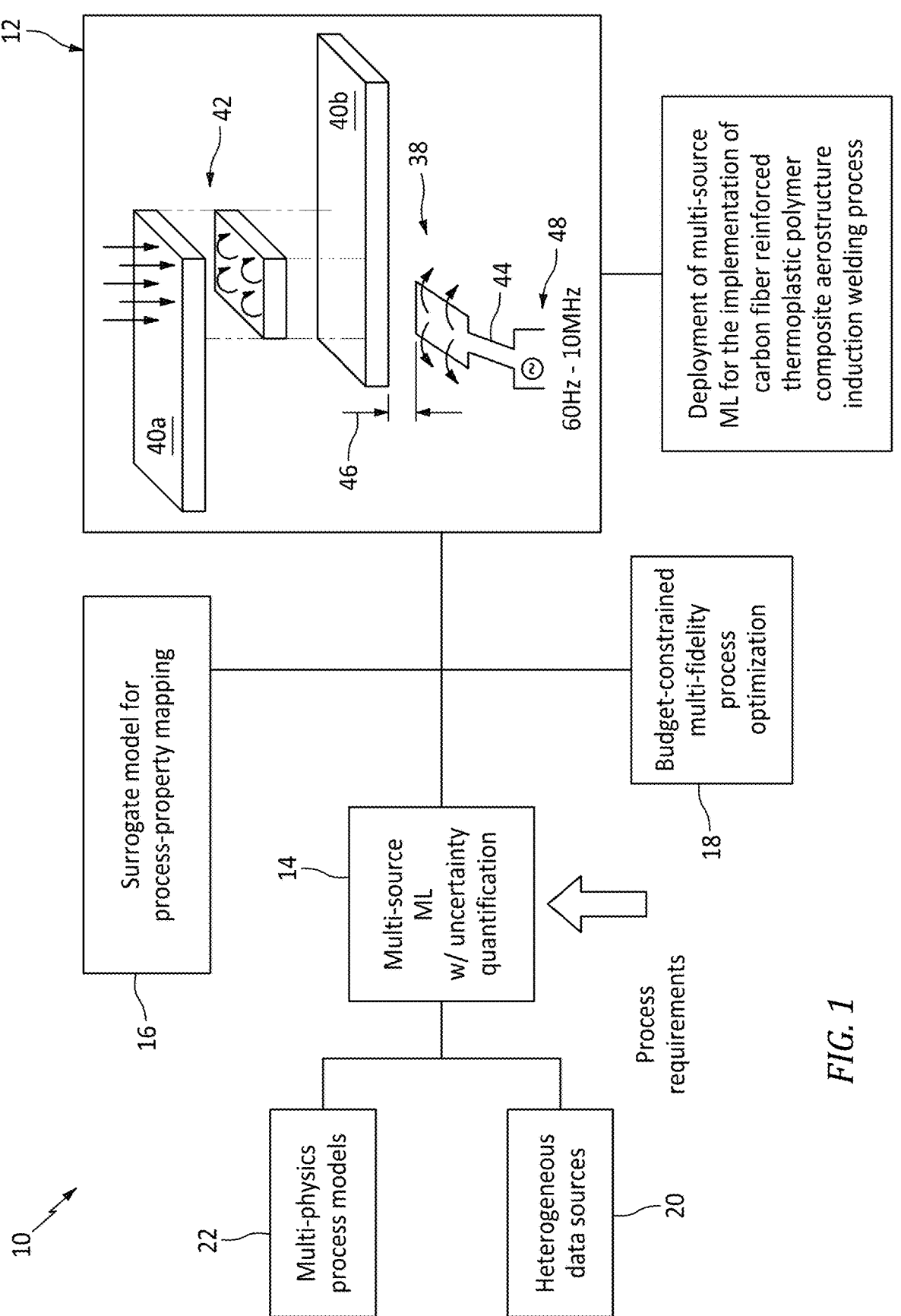
FIG. 1 is a schematic representation of an exemplary technique.

Referring now to FIG. 1, there is illustrated an exemplary technique 10 employed for thermoplastic composite (TPC) welding 12. In order to increase the speed, reduce the cost and minimize the usage of energy in the manufacturing of thermoplastic composites, it is important to optimize the manufacturing process parameters. There is a complex interplay of materials, physics, and manufacturing methods in the CFRTP welding process 12, which makes the process optimization task very challenging. The disclosure includes a multi-source machine learning (ML) modeling technique 10 for advancing the manufacture and assembly of high performance, lightweight, thermoplastic composite, such as carbon fiber reinforced thermoplastic polymer (CFRTP) aerospace products.

The disclosed process aims to address the problems through the formulation of a multi-source ML framework 14 which can provide (i) fast and accurate surrogate models for process-property mapping 16, and (ii) data efficient estimates of optimal process parameters through budget-constrained multi-fidelity process optimization 18. This framework 14, when deployed, can rapidly optimize the CFRTP manufacturing process under resource constraints. The framework 14 can also involve a principled estimate of uncertainties associated with the ML predictions, which is critical for the data limited regime of application. The efficient methodology 10 includes fusing heterogeneous data sources 20 (multi-fidelity process models, experiments, etc.) along with multi-physics models 22 such as electromagnetic models, thermal models, materials models, as well as performing various lab-scale and industrial scale experiments over wide range of process parameters so that an ML framework can benefit from all of them, without requiring the generation of a prohibitively large data set understanding of the induction heating processes for CFRTP. The overall outline of the invention is summarized schematically in FIG. 1.

Figure 2:
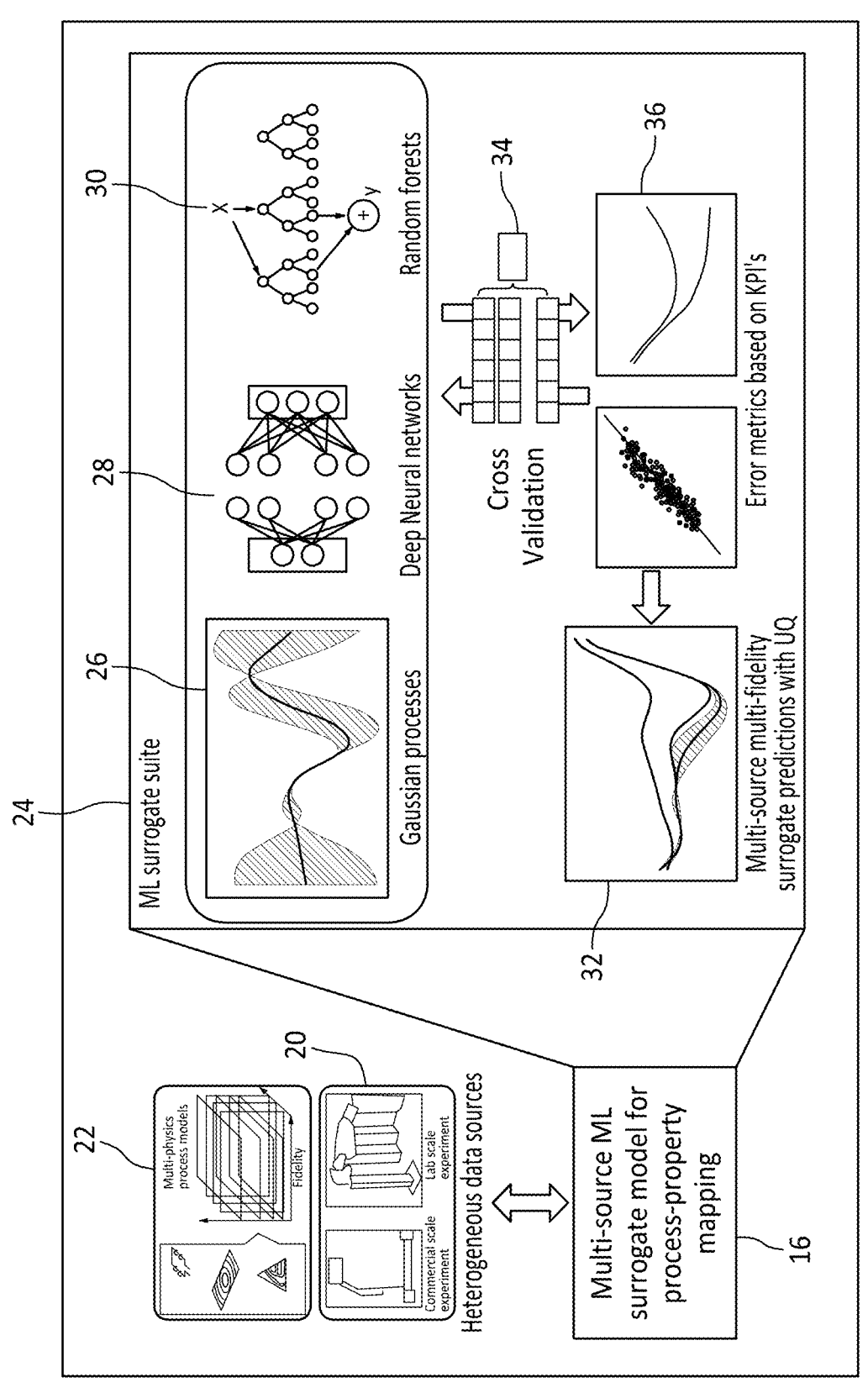
FIG. 2 is a schematic representation of a multi-source surrogate modeling formulation for process-property mapping in thermoplastics composite manufacturing.

Referring also to FIG. 2, the overall multi-source ML surrogate modeling framework for fast and accurate process-property mapping 16 of thermoplastic composites is shown in FIG. 2. The multi-source information will be leveraged to select an appropriate surrogate model from a suite of ML frameworks 24, such as Gaussian processes 26, deep neural networks 28, and random forests 30. The selected ML framework 14, being probabilistic in nature, will involve uncertainty quantification (UQ) 32 associated with the predictions, which will provide a quantified estimate of how much the ML predictions can be trusted in practice. The predictive posterior estimates with UQ from these fast surrogates can be directly used in offline process recipe development. The ML framework will be selected through extensive cross-validation 34 guided by error metrics 36 until desired key performance indicators (KPIs) for the manufacturing process are met.

The ML surrogate modelling workflow can be demonstrated for a CFRTP manufacturing problem where the objective is to meet temperature requirements at each point along a welded joint 12 (as seen in FIG. 1).

The multi-source surrogate model 16 will remove the computational bottleneck of accurate predictions of temperature fields in the CFRTP welded parts. This approach ensures (i) accurate process aware predictions due to the information fusion between experiments and multi-physics simulation data (ii) fast CFRTP welding process recipe generation, and (iii) computationally efficient CFRTP welding process optimization, along with UQ 32.

The disclosed innovation extends the methodologies of process optimization in TPCs by addressing the key technical areas.

One key technical area can be multi-source information fusion. The CFRTP manufacturing process involves data generated from different multi-physics simulation models 22 and experimental runs, which needs to be incorporated in the ML modeling framework 14. Currently, there exists no such methodology in the TPC manufacturing process optimization literature which can perform this information fusion efficiently.

The disclosed framework can be demonstrated by optimizing the CFRTP manufacturing process with respect to the temperature requirements in the welded parts, such that a minimum time above the melting temperature can be guaranteed for each point within a welded joint 12, without exceeding the maximum allowable temperature for the material and guaranteeing the cooling rate after welding to allow for recrystallization of the material.

Achieving this objective requires multi-physics simulations which capture the coupling between the electromagnetic (EM) field 38 and the thermal response of the CFRTP composite 40. To capture the fine spatio-temporal scales in such a complex physical process, high fidelity simulations are required, but they are prohibitively expensive to be solely relied upon for accurate surrogate formulation. However, low fidelity simulations, if available, are typically less accurate, but they are also less expensive, and they are often discarded in lieu of the more accurate higher fidelity counterparts. The ML framework aims to learn the degree of correlation present between the multi-fidelity models and the available experimental data, which can result in a multi-source ML model 14 that is computationally efficient. The statistical learning framework can leverage state-of-the-art multi-fidelity modeling techniques, such as linear and non-linear auto-regressive Gaussian processes, deep multi-fidelity Gaussian processes to learn the inter-source (and inter-fidelity) correlation, resulting in CFRTP welding process speed-up.

Moreover, the statistical modeling technique can also involve quantification of uncertainties associated with the predictions, along with estimates of how the uncertainties propagate due to interactions among the heterogeneous data sources. The multiple data sources can be adaptively sampled for training the ML framework until the predictions are adequately accurate and robust, such as up to 858-90% ML model accuracy when compared to baseline.

Another key technical area can include multi-source rapid process optimization.

The proposed surrogate model can assist in optimizing the CFRTP manufacturing process under design and budget constraints through an iterative multi-source rapid process optimization cycle. Given a trained surrogate model from an initial set of multi-source observations, the process optimization framework can leverage previous work on information-theoretic sampling for constrained Bayesian optimization to develop novel data acquisition strategies that can simultaneously account for (i) the mutual information across heterogeneous data sources, (ii) the expected information gain from acquiring a new sample at a given fidelity simulation or experiment, as well as (iii) the computational cost or operational time associated with evaluating each model or test runs in the multi-fidelity hierarchy of the problem. Equipped with these search strategies, the rapid process optimization cycle can iteratively find the optimal CFRTP welding process parameters for achieving the temperature requirements in the welded parts within predefined computational budget limitations.

Figure 3:
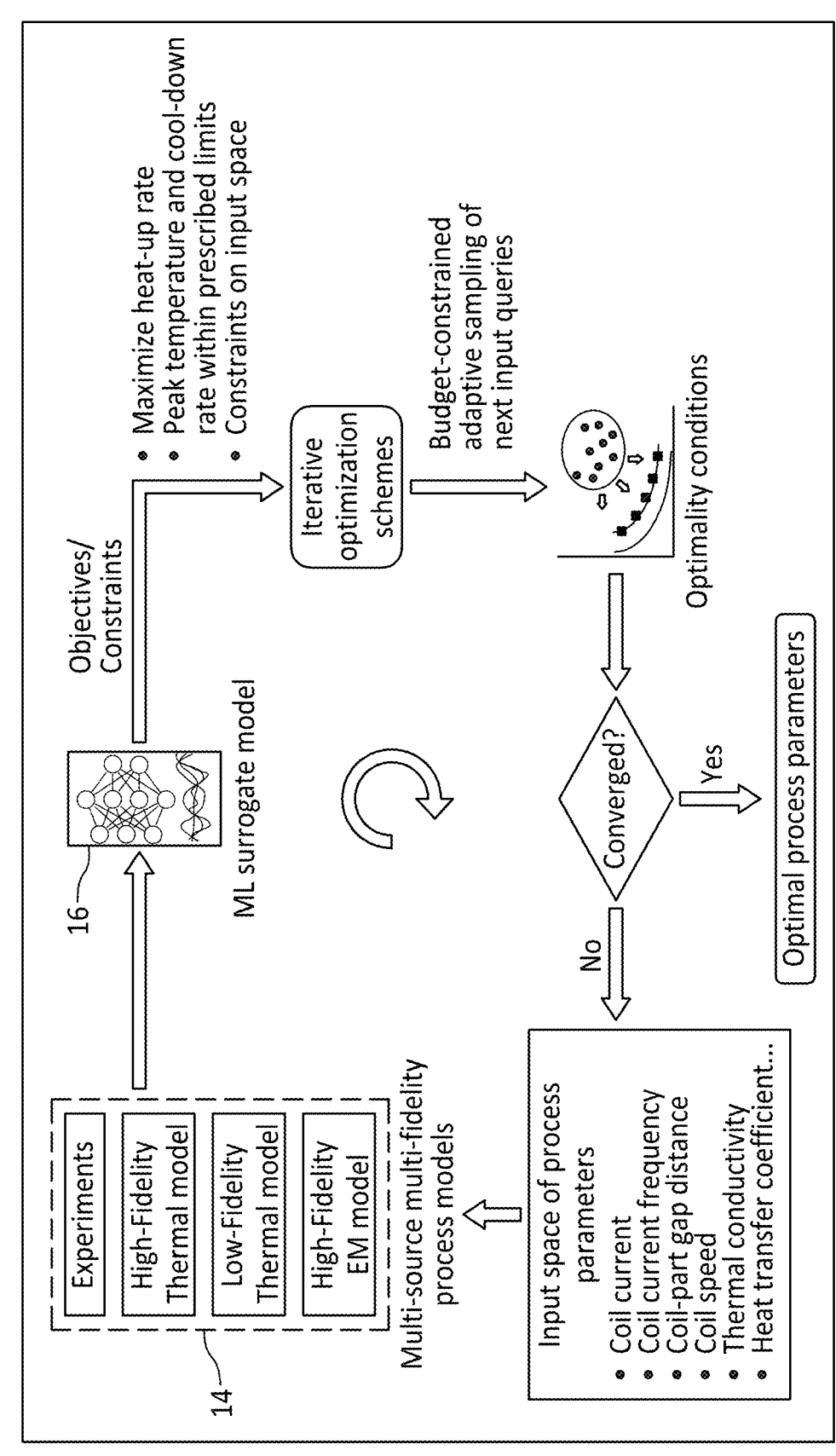
FIG. 3 is a schematic representation of the surrogate-model assisted process optimization.

Referring also to FIG. 3, a schematic of the disclosed multi-source surrogate modeling and optimization strategy 14 is shown. The outcome of the framework 14 is an accurate and computationally efficient surrogate model 16, which optimizes the CFRTP welding process which require estimates of the temperature fields in the welded parts. Moreover, the probabilistic formulation of the framework provides UQ associated with the field predictions, which can be effectively utilized to result in safe and reliable CFRTP welding process.

The disclosed framework 14 can be applied in practice to predict scalar fields, such as the power density field in the composite plies resulting from EM simulations, and the temperature field in the plies resulting from coupled EM—heat transfer simulations. Such field data predicted using simulations typically belong to a high dimensional space, due to the large number of collocation points ($\sim \mathcal{O}(10^3)$) in the simulations for resolving fine spatial scales. Hence, suitable dimensional reduction techniques using deep auto-encoders can be utilized for reducing the dimension of the data to a tractable number for the heterogeneous information fusion. Correlation among the different sources (and fidelity levels) can be learned in the reduced dimensional space as a function of the process parameters for efficient and accurate mapping to the spatio-temporal field predictions.

The disclosed approach can be performed in a single source setting of EM simulation data generated using a Finite-Element Analysis (FEA) model, whereby a machine learning surrogate model 16 predicts the power density field in the top 40*a* and the bottom 40*b* composite parts of a flat single lap joint 42 (FIG. 1). A 3-dimensional space of EM process parameters has been identified in the induction coil 44 current [A], coil-to-part gap 46 distance [mm] and the induction coil current frequency 48 [KHz]. Experiments guide the definition of the upper and lower limits of the 3-dimensional parameter space, within which a design of experiments of a limited number of points ($\sim \mathcal{O}(10)$ parameter combinations) initiate the ML model training and validation.

Figure 4:
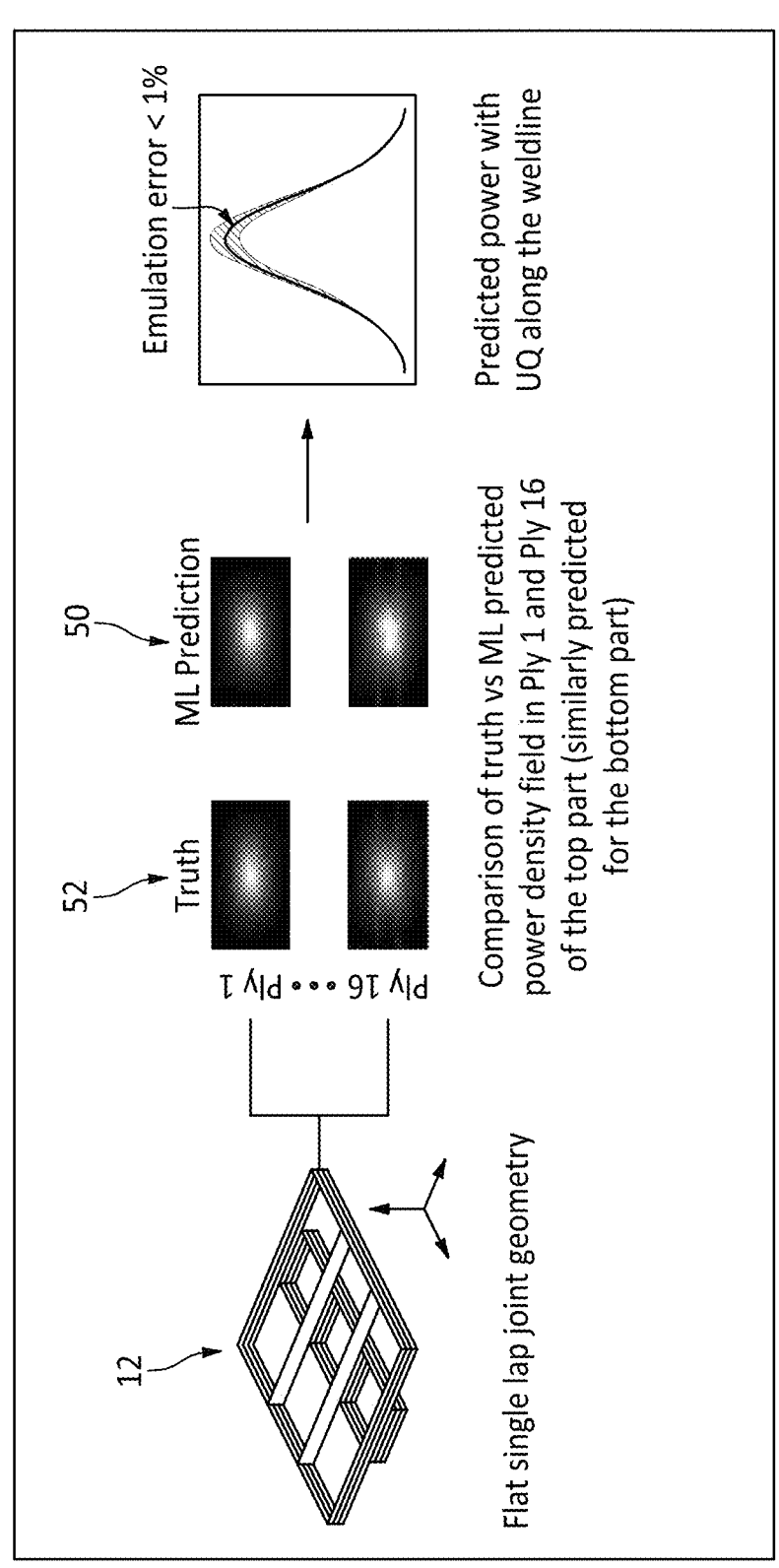
FIG. 4 is a schematic representation of a machine learning surrogate model for prediction of power density field for unknown electromagnetic process parameters.

Also referring to FIG. 4, the results of the experiments are shown in FIG. 4. The ML surrogate model predicts ML the power density fields 50 in the parts to be welded for an unknown process parameter combination. The predicted power density field 50 results in a close match with the truth 52 when the weldline power profiles are compared. The quantified uncertainties from the ML model lends interpretability about the confidence associated with the ML predictions 50. As an example, a resulting ML model could be found 100× faster than the FEA simulations in generating the power density field data for unknown EM process parameter combinations within the studied range. In the future, the ML surrogate framework 14 can utilize multi-fidelity data sources in the heat transfer simulations, as well as available experimental data for predicting the temperature field in the welded parts. Finally, an end-to-end surrogate model, involving surrogates for EM and thermal fields can be utilized for rapid process optimization of the CFRTP manufacturing process.

Data-driven TPC manufacturing process optimization includes ML techniques which optimize the underlying manufacturing processes, given a source of data such as experiments or simulations. However, there is no existing technology for thermoplastics manufacturing which can reduce the cost of process optimization by leveraging heterogeneous multi-fidelity data sources for process optimization. Moreover, the correlation among the data sources is challenging to model, particularly with limited data, which has not been considered in the existing methodologies. This limits the applicability of the existing methodologies to the restrictive assumptions and data limitations of their underlying data sources. This problem is aggravated by the resource-intensiveness of the sources because the cost involved in generating enough data for an accurate ML surrogate model is typically very high.

Figure 5:
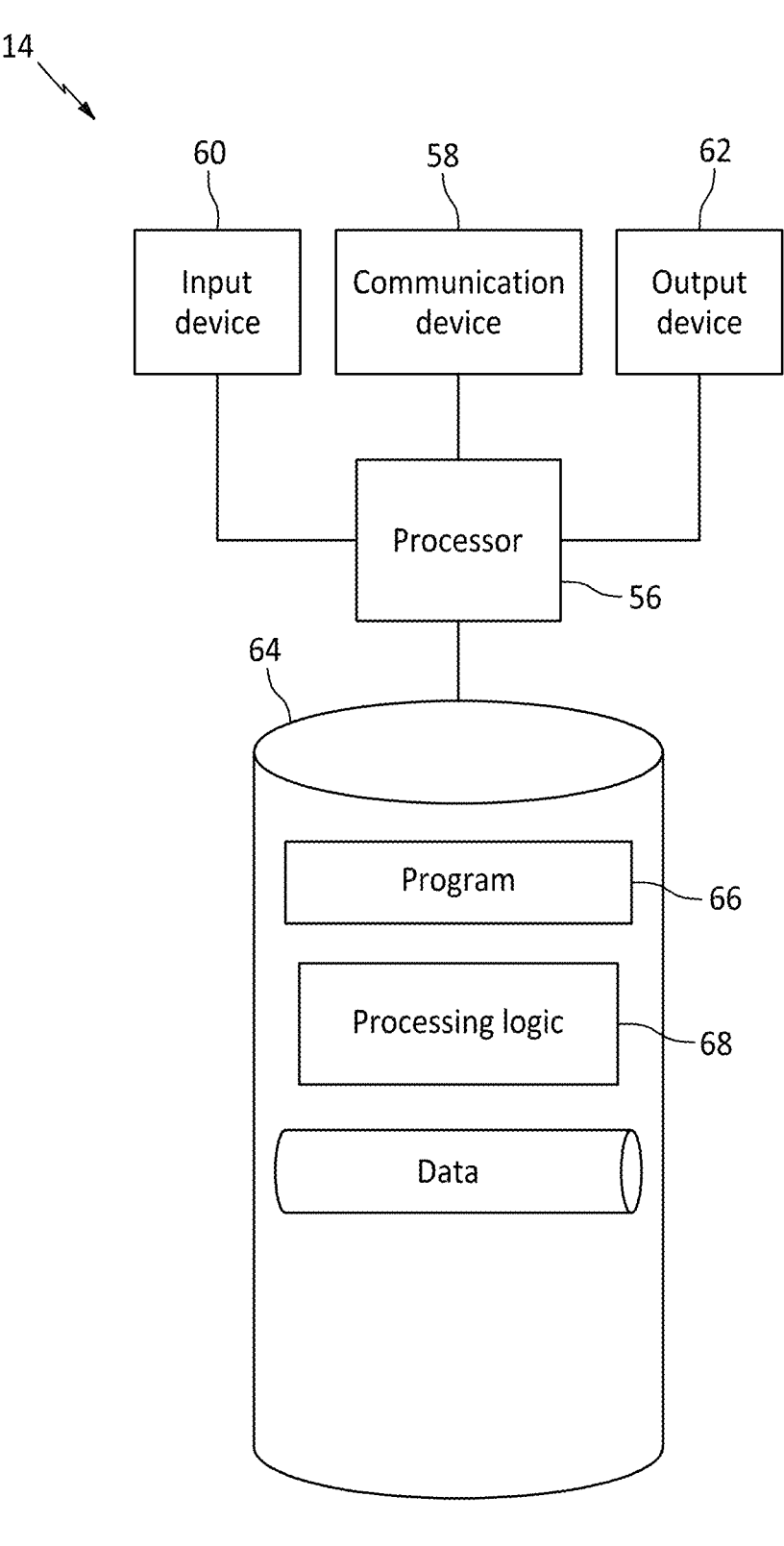
FIG. 5 is a schematic representation of an exemplary multi-source machine learning framework.

Referring also to FIG. 5, the embodiments described herein may be implemented using any number of different hardware configurations. For example, FIG. 1 illustrates a multi-source machine learning framework 14 which comprises a processor ("processor"), such as one or more commercially available Central Processing Units (CPUs) in the form of one-chip microprocessors, coupled to a communication device 58 configured to communicate via a communication network (not shown in FIG. 6). The communication device 58 may be used to communicate, for example, with one or more users. The multi-source machine learning framework 14 further includes an input device 60 (e.g., a mouse and/or keyboard, buttons, touch-screen to enter information) and an output device 62 (e.g., to output and display the data).

The processor 56 also communicate with a memory/storage device 64. The storage device 64 may comprise any appropriate information storage device, including combinations of magnetic storage devices (e.g., a hard disk drive), optical storage devices, mobile telephones, and/or semiconductor memory devices. The storage device 64 may store a program 66 and/or processing logic 68 for controlling the processor 56. The processor 56 performs instructions of the programs 66, 68, and thereby operates in accordance with any of the embodiments described herein. For example, the processor 56 may receive data and then may apply the instructions of the programs 66, 68 to determine at least one data set.

A technical advantage of the disclosed process includes, the capacity to tackle the bottleneck of high cost associated with data generation from a single data source, by effectively learning the inter-source (and inter-fidelity) correlation among the multi-source (and multi-fidelity) hierarchy of the data sources in the thermoplastics manufacturing problem under consideration.

Another technical advantage of the disclosed process includes the ML model will help in identifying the critical process parameters affecting the quality of the welding process.

Another technical advantage of the disclosed process includes the application of the proposed multi-source ML surrogate modeling framework can result in 2× faster CFRTP process design optimization.

Another technical advantage of the disclosed process includes up to ~25% energy savings over the baseline design process recipe.

Another technical advantage of the disclosed process includes increase the efficiency, speed and scalability of the current TPC manufacturing processes.

Another technical advantage of the disclosed process includes the application of the proposed framework which results in much faster CFRTP process parameter optimization than previously used techniques.

There has been provided a process. While the process has been described in the context of specific embodiments thereof, other unforeseen alternatives, modifications, and variations may become apparent to those skilled in the art having read the foregoing description. Accordingly, it is intended to embrace those alternatives, modifications, and variations which fall within the broad scope of the appended claims.

What is claimed is:

1. A processor system comprising a computer readable storage device readable by the system, tangibly embodying a program having a set of instructions executable by the system to perform the following steps for multi-source machine learning modeling framework for process property mapping of thermoplastic composite manufacturing, the set of instructions comprising:

an instruction to select a surrogate machine learning model from a suite of machine learning frameworks;

an instruction to involve uncertainty quantification associated with predictions which provide a quantified estimate of how much the multi-source machine learning model can be trusted;

an instruction to provide multi-physics process model output to the machine learning model;

an instruction to provide heterogeneous data sources for use by the machine learning model;

an instruction to determine estimates of optimal process parameters employing budget-constrained multi-fidelity process optimization;

an instruction for deployment of the multi-source machine learning model in the implementation of carbon fiber reinforced thermoplastic polymer induction welding;

an instruction to select the multi-source machine learning modeling framework through cross-validation guided by error metrics until predetermined key performance indicators for the thermoplastic composite manufacturing process are met; and an instruction to perform induction welding via machine learning informed process parameter recipes.

2. The system according to claim 1, further comprising:

an instruction to leverage multi-source information to select an appropriate surrogate model from the suite of machine learning frameworks, the suite of machine learning frameworks including Gaussian processes, deep neural networks, and random forests.

3. The system according to claim 1, further comprising:

an instruction to employ predictive posterior estimates with uncertainty quantification from the fast surrogates in offline process recipe development.

4. The system according to claim 1, further comprising:

an instruction to demonstrate temperature requirements at each point along a welded joint of the thermoplastic composite manufacturing process.

5. The system according to claim 1, further comprising:

an instruction to utilize temperature requirements in thermoplastic composite welded parts, such that a minimum time above a melting temperature can be obtained for each point within a welded joint, without exceeding a maximum allowable temperature for the material of the thermoplastic composite welded parts and obtaining a cooling rate after welding to allow for recrystallization of the material of the thermoplastic composite welded parts.

6. A welding processing system using a multi-source machine learning modeling framework for process-property mapping of thermoplastic composite manufacturing comprising:

a thermoplastic composite welding system configured to capture data for at least one of a temperature, coil current, compaction force and process time associated with induction welding thermoplastic composite welded part; and a processor coupled to said thermoplastic composite welding system, said processor configured to implement the welding recipes generated by the multi-source machine learning modeling framework;

a tangible, non-transitory memory configured to communicate with said processor, the tangible, non-transitory memory having instructions stored therein that, in response to execution by the processor, cause the processor to perform operations comprising:

receiving, by the processor, the temperature requirements in the thermoplastic composite welded part;

selecting, by the processor, a machine learning model;

determining, by the processor, a quantified estimate of how much the machine learning model can be trusted by use of uncertainty quantification associated with predictions which provide the estimate;

providing, by the processor, heterogeneous data sources for use by the machine learning model;

providing, by the processor, multi-physics process output from the heterogeneous data sources to the machine learning model;

deploying, by the processor, the multi-source machine learning model recipes for the implementation of carbon fiber reinforced thermoplastic polymer induction welding;

determining, by the processor, estimates of optimal process parameters employing budget-constrained multi-fidelity process optimization;

providing, by the processor, an optimized recipe for performing induction welding;

fusing heterogeneous data sources along with multi-physics models including electromagnetic models, thermal models and/or materials models; and performing at least one lab-scale experiment and at least one industrial scale experiment over a range of process parameters wherein the machine learning modeling framework can benefit from all of them in the absence of requiring the generation of a data set of the induction heating processes for carbon fiber reinforced thermoplastic polymer induction welding.

7. The system for a multi-source machine learning modeling framework of claim 6, wherein said processor further comprises operations comprising:

leveraging multi-source information to select a surrogate model from the suite of machine learning frameworks, the suite of machine learning frameworks including Gaussian processes, deep neural networks, and random forests.

8. The system for a multi-source machine learning modeling framework of claim 6, wherein said processor further comprises operations comprising:

utilizing temperature requirements in thermoplastic composite welded part;

obtaining a minimum time above a melting temperature for each point within a welded joint, in the absence of exceeding a maximum allowable temperature for the material of the thermoplastic composite welded part; and obtaining a cooling rate after welding to allow for recrystallization of the material of the thermoplastic composite welded part.

9. The system for a multi-source machine learning modeling framework of claim 6, wherein said processor further comprises operations comprising:

learning a degree of correlation present between multi-fidelity models and available experimental data, resulting in a multi-source machine learning model that is computationally efficient.

10. The system for a multi-source machine learning modeling framework of claim 6, wherein said processor further comprises operations comprising:

optimizing the thermoplastic composite manufacturing process under design and budget constraints through an iterative multi-source rapid process optimization cycle.

11. The system for a multi-source machine learning modeling framework of claim 6, wherein said processor further comprises operations comprising:

providing a trained surrogate model from an initial set of multi-source observations;

leveraging previous work on information-theoretic sampling for constrained Bayesian optimization to develop data acquisition strategies that can simultaneously account for (i) the mutual information across heterogeneous data sources, (ii) the expected information gain from acquiring a new sample at a given fidelity simulation or experiment, and (iii) the computational cost or operational time associated with evaluating each model or test runs in the multi-fidelity hierarchy of the problem.

12. The system for a multi-source machine learning modeling framework of claim 11, wherein said processor further comprises operations comprising:

iteratively finding optimal welding process parameters for achieving temperature requirements in weld parts within predefined computational budget limitations.

13. The system for a multi-source machine learning modeling framework of claim 6, wherein said processor further comprises operations comprising:

applying the multi-source machine learning modeling framework to predict scalar fields, including a power density field in composite plies resulting from EM simulations, and a temperature field in the composite plies resulting from coupled electromagnetic heat transfer simulations.

14. The system for a multi-source machine learning modeling framework of claim 6, wherein said processor further comprises operations comprising:

utilizing suitable dimensional reduction techniques such as deep autoencoders; and reducing a dimension of data to a tractable number for heterogeneous information fusion.

15. The system for a multi-source machine learning modeling framework of claim 6, wherein said processor further comprises operations comprising:

predicting, by use of the multi-source machine learning modeling framework, power density and temperature fields in parts to be welded for an unknown process parameter combination.

* * * * *